(12) United States Patent
Liu et al.

(10) Patent No.: US 8,431,053 B2
(45) Date of Patent: Apr. 30, 2013

(54) METHOD FOR MAKING CARBON NANOTUBE STRUCTURE

(75) Inventors: Liang Liu, Beijing (CN); Chen Feng, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 274 days.

(21) Appl. No.: 12/855,879

(22) Filed: Aug. 13, 2010

(65) Prior Publication Data

US 2011/0140309 A1 Jun. 16, 2011

(30) Foreign Application Priority Data

Dec. 11, 2009 (CN) .......................... 2009 1 0250642

(51) Int. Cl.
*B01F 9/12* (2006.01)

(52) U.S. Cl.
USPC .............. 264/81; 264/146; 264/400; 977/842

(58) Field of Classification Search ............... 264/81, 264/146, 400; 977/842
See application file for complete search history.

(56) References Cited

U.S. PATENT DOCUMENTS

| 7,045,108 | B2 * | 5/2006 | Jiang et al. ................. 423/447.2 |
| 7,459,627 | B2 * | 12/2008 | Lee et al. ........................ 174/28 |
| 7,938,996 | B2 * | 5/2011 | Baughman et al. ........... 264/108 |
| 8,048,256 | B2 * | 11/2011 | Feng et al. ..................... 156/305 |
| 2007/0031299 | A1 * | 2/2007 | Jiang et al. ..................... 422/129 |
| 2007/0166223 | A1 * | 7/2007 | Jiang et al. ................. 423/447.1 |
| 2007/0292614 | A1 | 12/2007 | Liu et al. |
| 2008/0170982 | A1 * | 7/2008 | Zhang et al. ............... 423/447.3 |
| 2008/0248235 | A1 * | 10/2008 | Feng et al. ..................... 428/113 |
| 2009/0104832 | A1 * | 4/2009 | Fu et al. ........................... 445/24 |
| 2009/0208708 | A1 * | 8/2009 | Wei et al. ...................... 428/174 |
| 2010/0282403 | A1 | 11/2010 | Liu et al. |
| 2011/0142744 | A1 * | 6/2011 | Feng et al. ................. 423/447.1 |

FOREIGN PATENT DOCUMENTS

| CN | 1948144 | 4/2007 |
| CN | 101407312 | 4/2009 |

* cited by examiner

*Primary Examiner* — Christina Johnson
*Assistant Examiner* — Saeed Huda
(74) *Attorney, Agent, or Firm* — Altis Law Group, Inc.

(57) ABSTRACT

The present disclosure relates to a method for making a carbon nanotube structure. The method includes steps of providing a tubular carbon nanotube array; selecting a carbon nanotube segment having a predetermined width from the tubular carbon nanotube array using a drawing tool; and drawing the carbon nanotube segment along a radial direction of the tubular carbon nanotube array to achieve the carbon nanotube structure.

19 Claims, 10 Drawing Sheets

METHOD FOR MAKING CARBON NANOTUBE STRUCTURE

CROSS-REFERENCE TO RELATED APPLICATIONS

This application claims all benefits accuring under 35 U.S.C. §119 from China Patent Application No. 200910250642.6, filed on Dec. 11, 2009, in the China Intellectual Property Office, the disclosure of which is incorporated herein by reference. This application is related to commonly-assigned applications entitled, "METHOD FOR MAKING CARBON NANOTUBE FILM", filed on Aug. 13, 2010, U.S. patent application Ser. No. 12/856,541; "METHOD FOR MAKING CARBON NANOTUBE STRUCTURE", filed on Aug. 13, 2010, U.S. patent application Ser. No. 12/855,875; "METHOD AND APPARATUS FOR FORMING CARBON NANOTUBE ARRAY", filed on Aug. 13, 2010, U.S. patent application Ser. No. 12/855,883.

BACKGROUND

1. Technical Field

The present disclosure relates to a method for making a carbon nanotube structure.

2. Description of Related Art

Recently, as increasing needs for forming separate and tiny carbon nanotubes into manipulable carbon nanotube structures, an untwisted carbon nanotube wire has been fabricated by drawing from a carbon nanotube array disclosed by patent U.S. Pat. No. 7,045,108 to Jiang et al. The untwisted carbon nanotube wire is free standing and includes a plurality of carbon nanotubes joined end-to-end by van der Waals attractive force therebetween. The carbon nanotubes in the untwisted carbon nanotube wire are substantially aligned along the length direction of the carbon nanotube wire. Thus, this carbon nanotube wire has good properties, such as thermal and electrical conductivities, along the direction of the aligned carbon nanotubes. Therefore, the carbon nanotube wire can be used in many different fields. Similarly, a carbon nanotube film can be fabricated by drawing a film from the carbon nanotube array.

However, sizes of the carbon nanotube wire and carbon nanotube film which are directly drawn from the carbon nanotube arrays are restricted by the sizes of the carbon nanotube arrays. During the growing of the carbon nanotube array by using a CVD method, the inner gas pressure of the tube furnace is less than the atmosphere pressure outside the tube furnace. Therefore, the sidewall of the tube furnace has to bear an inward pressure difference applied thereon. When the tube furnace with a diameter of about 10 inches and a length of about 2 meters has the inner gas pressure of about 10 torr, the pressure difference between inside and outside of the tube furnace is about 50,000 Newton. However, if the diameter of the tube furnace increased to 40 inches, the pressure difference could reach to about 200,000 Newton. Further, as the increase of the diameter of the tube furnace, the curvature of the sidewall of the tube furnace decreases, and thus weakens the support of the sidewall. Therefore, as the increase of the diameter of the tube furnace, a large inward pressure difference may cause a damage of the tube furnace.

Accordingly, the tube furnace with a larger diameter can hardly be achieved. The conventional tube furnace for growing the carbon nanotube array has a diameter of about 10 inches. Therefore, the silicon wafer disposed inside the tube furnace should have a diameter less than 10 inches, such as 8 inches. An orginal carbon nanotube film directly drawn from the carbon nanotube array grown on that 8-inch-silicon-wafer has a width restricted to 8 inches. The diameter of the carbon nanotube wire is also restricted.

What is needed, therefore, is to provide a method for making a carbon nanotube structure having relatively large size.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "another", "an", or "one" embodiment in this disclosure are not necessarily to the same embodiment, and such references mean at least one.

Figure 1:
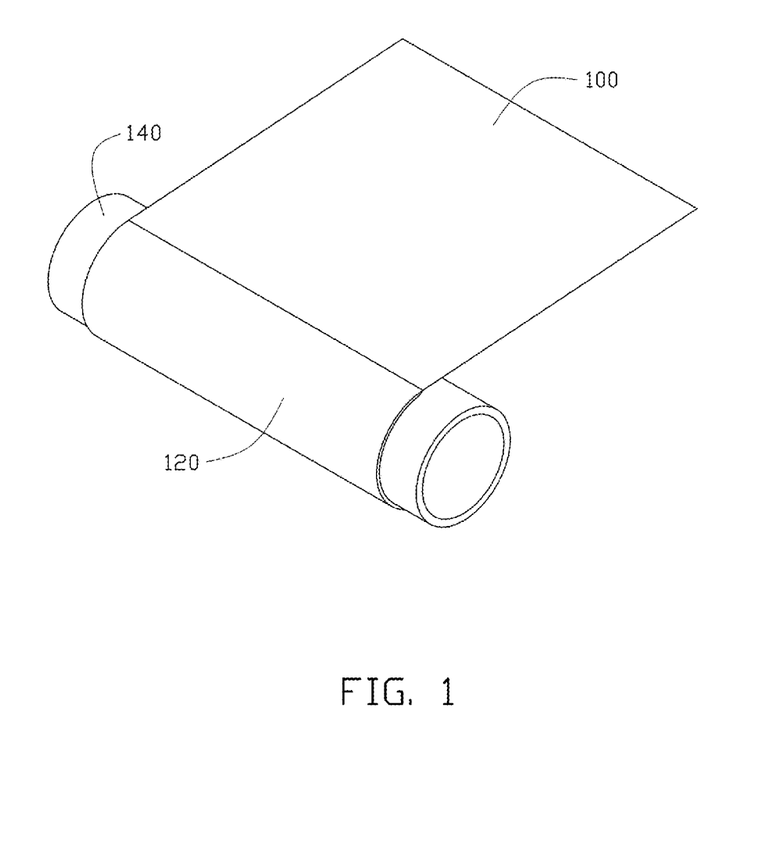
FIG. 1 is a schematic structural view of an embodiment of a process of drawing a carbon nanotube film from a tubular carbon nanotube array.
Figure 6:
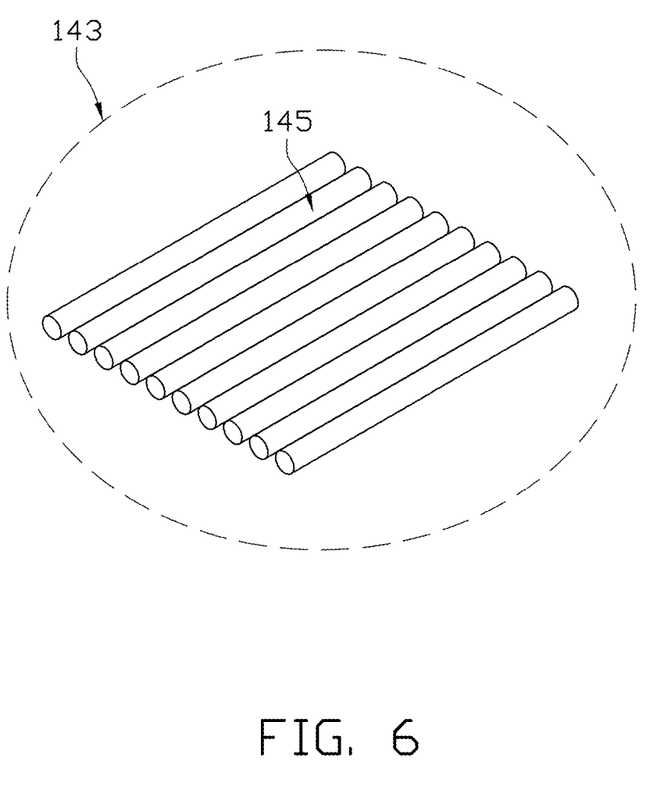
FIG. 6 is a schematic structural view of a carbon nanotube segment.

Referring to FIGS. 1-6, an embodiment of a method for making a carbon nanotube structure 100 includes steps of:

S11, providing a tubular carbon nanotube array 120;

S12, selecting a carbon nanotube segment 143 having a predetermined width from the tubular carbon nanotube array 120 using a drawing tool (e.g., adhesive tape, pliers, tweezers, or another tool allowing multiple carbon nanotubes to be gripped and pulled simultaneously); and S13, drawing the carbon nanotube segment 143 along a direction perpendicular to an axial direction of the tubular carbon nanotube array 120 to achieve the carbon nanotube structure 100.

In step S11, the tubular carbon nanotube array 120 is formed on a cylindrical surface of a substrate 140. The cylindrical surface is a substantially smoothly curving surface. The cylindrical surface is a surface generated by a straight line intersecting and moving along a smooth plane curve, i.e., the directrix, while remaining parallel to a fixed straight line that is not on or parallel to the plane of the directrix. In one embodiment, the plane curve is closed, and the cylindrical surface can be a tubular cylindrical surface. In another embodiment, the plane curve is a closed round circular, and the cylindrical surface can be a round cylindrical surface.

In one embodiment, the tubular carbon nanotube array 120 is a super aligned carbon nanotube array and includes a plurality of carbon nanotubes substantially perpendicular to the cylindrical surface of the substrate 140. The tubular carbon nanotube array 120 is essentially free of impurities such as carbonaceous or residual catalyst particles. The carbon nanotubes in the tubular carbon nanotube array 120 are closely packed together by van der Waals attractive force. Accordingly, a free-standing carbon nanotube structure 100 can be drawn from the tubular carbon nanotube array 120. The tubular carbon nanotube array 120 can be grown on the cylindrical surface of the substrate 140 by using the chemical vapor deposition (CVD) method. In one embodiment, the method for growing the super aligned tubular carbon nanotube array 120 includes steps of:

(a) providing a substrate 140 including at least one cylindrical surface;
(b) forming a catalyst layer on the at least one cylindrical surface;
(c) annealing the substrate 140 with the catalyst layer at a temperature in an approximate range from 300° C. to 900° C. (e.g., 700° C.) in air for about 30 minutes to about 90 minutes;
(d) heating the substrate 140 with the catalyst layer at a temperature in an approximate range from 400° C. to 900 ° C. (e.g., 740° C.) in a furnace with a protective gas therein; and
(e) supplying a carbon source gas into the furnace for about 5 minutes to 30 minutes and growing the super-aligned tubular carbon nanotube array 120 from the at least one cylindrical surface of the substrate 140.

The cylindrical surface of the substrate 140 can be, but is not limited to, the outer circumference surface of a hollow tubular structure or a columnar structure. The tubular structure can be a hollow tube or the tube with a linear shaped opening parallel to an axial direction of the tube. The length of the linear shaped opening can be equal to the length of the tube. The columnar structure can be a solid column with an outer sidewall of the tubular cylindrical surface.

The substrate 140 can be the hollow tubular structure with the outer circumference surface, and the outer circumference surface can be the cylindrical surface of the substrate 140.

Figure 2:
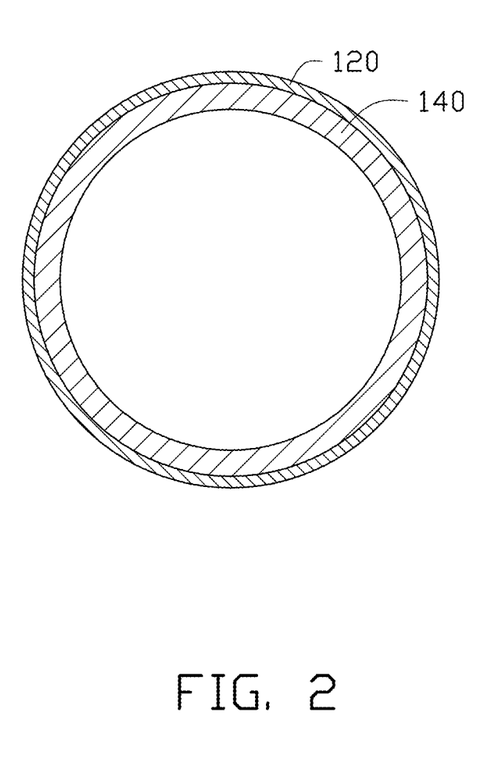
FIG. 2 is a cross sectional view of an embodiment of a tubular structure with a tubular carbon nanotube array formed on an outer circumference surface thereof.

Referring to FIG. 2, in one embodiment, the substrate 140 is the closed tubular structure with a closed round-annular cross section. The closed tubular structure can be the tube without the linear shaped opening. The cross section is substantially perpendicular to the length direction of the tubular structure. The tubular carbon nanotube array 120 is formed on the outer circumference surface of the substrate 140 to form a closed tubular carbon nanotube array 120.

Figure 3:
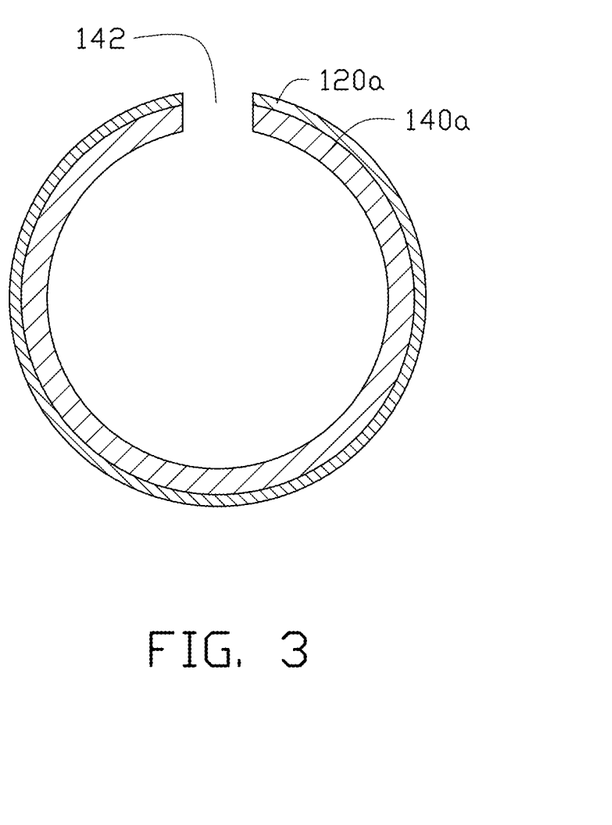
FIG. 3 is a cross sectional view of another embodiment of an opened tubular structure with a C shaped cross section with the tubular carbon nanotube array formed on the outer circumference surface thereof.

Referring to FIG. 3, in another embodiment, the substrate 140a is an opened tubular structure with a C shaped cross section. The opened tubular structure can be the tube with the linear shaped opening. The cross section is substantially perpendicular to the length direction of the tubular structure. The tubular carbon nanotube array 120a is formed on the outer circumference surface of the substrate 140a, to form an opened tubular carbon nanotube array 120a. The opened tubular carbon nanotube array 120a includes a linear shaped opening that can be substantially parallel to the axial direction of the opened tubular carbon nanotube array 120a.

Figure 4:
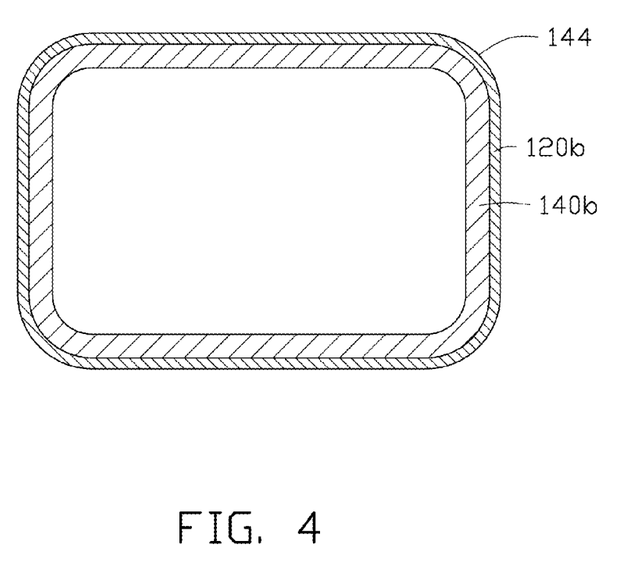
FIG. 4 is a cross sectional view of yet another embodiment of a closed tubular structure with a rectangle-annular cross section with the tubular carbon nanotube array formed on the outer circumference surface thereof.

Referring to FIG. 4, in yet another embodiment, the substrate 140b is a closed tubular structure with a rectangle-annular cross section. The cross section is substantially perpendicular to the length direction of the tubular structure. The rectangle-annular cross section has four rounding corners 144. The tubular carbon nanotube array 120b is formed on the outer circumference surfaces of the substrate 140b to form a closed tubular carbon nanotube array 120b.

Figure 5:
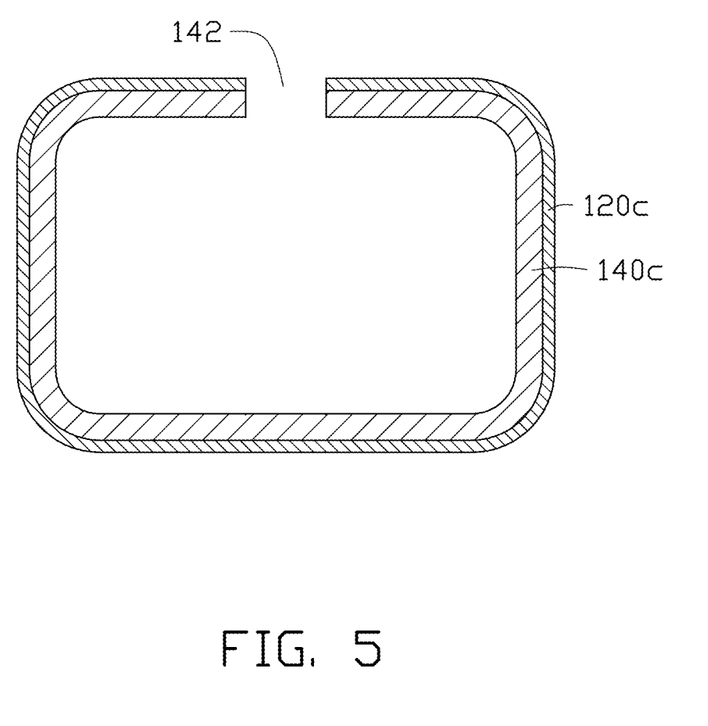
FIG. 5 is a cross sectional view of yet another embodiment of an opened tubular structure with a rectangle-annular cross section with the tubular carbon nanotube array formed on the outer circumference surface thereof.

Referring to FIG. 5, in yet another embodiment, the substrate 140c is an opened tubular structure with a rectangle-annular cross section. The cross section is substantially perpendicular to the length direction of the tubular structure. The rectangle-annular cross section has an opening and four rounding corners. The tubular carbon nanotube array 120c is formed on the outer circumference surface of the substrate 140c to form an opened tubular carbon nanotube array 120c. The opened tubular carbon nanotube array 120c includes a linear shaped opening 142 substantially parallel to an axial direction of the opened tubular carbon nanotube array 120c.

It is understood that the substrate is not limited to the above-mentioned shaped substrates 140, 140a, 140b and 140c, but can also be a tubular structure with an oval-annular cross section, or polygon-annular cross section with rounding corners. The cross section is substantially perpendicular to the length direction of the tubular structure. The polygon can be a triangle or a quadrangle. The tubular structure can be the closed tubular structure or the opened tubular structure with linear shaped opening substantially parallel to the axial direction of the tubular structure. It is also understood that the tubular structure includes at least one opening at one end. In one embodiment, the tubular structure includes two openings at two opposite ends thereof.

The substrate can be a columnar structure including a sidewall, and the sidewall is the cylindrical surface of the substrate. Similar to the tubular structure, the cross section of the columnar structure can have a round shape, an oval shape, or a polygon shape with rounding corners. Further, the columnar structure can further include a linear shaped groove substantially parallel to an axial direction of the columnar structure.

The material of the substrate must bear the annealing temperature and growing temperature during the growing of the carbon nanotube array. The material of the substrate can be quartz, high temperature glass, P-type silicon, N-type silicon, metals with high melting points. In one embodiment, the tubular cylindrical surface of the substrate can include a silicon dioxide layer. In one embodiment, the substrate 140 can be a quartz tube with smooth outer circumference surface.

The catalyst layer can be made of iron (Fe), cobalt (Co), nickel (Ni), or any alloy thereof. In one embodiment, the catalyst layer is a Fe layer with a thickness of 5 nanometers. The catalyst layer can be deposited on the outer circumference surface of the quartz tube. The protective gas can be made up of at least one of nitrogen ($N_2$), ammonia ($NH_3$), and a noble gas. The carbon source gas can be a hydrocarbon gas, such as ethylene ($C_2H_4$), methane ($CH_4$), acetylene ($C_2H_2$), ethane ($C_2H_6$), or any combination thereof.

When the furnace is a tube furnace, the substrate 140 can be disposed in the tube furnace with the axis of the cylindrical surface substantially parallel to the axis of the tube furnace. Further, a bracket can be used to support the substrate 140 in the furnace, thereby suspending the substrate 140 in the furnace.

The top surface of the tubular carbon nanotube array 120 is a cylindrical surface substantially coaxial to the cylindrical surface of the substrate 140. The tubular carbon nanotube array 120 can be grown on the entire area of the cylindrical surface of the substrate 140. The carbon nanotubes of the tubular carbon nanotube array 120 can be selected from single-walled, double-walled, and/or multi-walled carbon nanotubes. Diameters of the single-walled carbon nanotubes approximately range from 0.5 nanometers (nm) to 50 nm. Diameters of the double-walled carbon nanotubes approximately range from 1 nm to 50 nm. Diameters of the multi-walled carbon nanotubes approximately range from about 1.5 nm to about 50 nm. The height of the carbon nanotubes can be approximately 2 microns to approximately 10 millimeters. In one embodiment, the height of the carbon nanotubes can range from about 100 microns to about 900 microns.

If the substrate 140 is the opened tubular structure, the tubular carbon nanotube array 120 also includes a linear shaped opening substantially parallel to the axis thereof. If the closed tubular carbon nanotube array 120 is formed on the closed tubular structure, a linear shaped section of the closed tubular carbon nanotube array 120 can be further removed and the opening tubular carbon nanotube array 120 can be formed on the closed tubular structure.

Referring to FIG. 6, in step S12, the carbon nanotube segment 143 includes a single carbon nanotube or a plurality of adjacent carbon nanotubes 145 substantially parallel to each other and combined by van der Waals attractive force. The carbon nanotube segments can vary in width, thickness, uniformity and shape. The drawing tool selects and pulls the initial carbon nanotube segment 143. The selecting step of S2 can be processed by clipping the carbon nanotube segment 143 by the pliers or tweezers, or adhering the carbon nanotube segment 143 by the adhesive tape from the tubular carbon nanotube array 120.

The width direction of the carbon nanotube segment 143 is substantially perpendicular to the carbon nanotubes 145 in the carbon nanotube segment 143. In one embodiment, the drawing tool can select the carbon nanotube segment 143 along the width direction of the carbon nanotube segment 143, that is substantially parallel to the length direction of the tubular carbon nanotube array 120. The width of the carbon nanotube segment 143 can be equal to the length of the tubular carbon nanotube array 120 along the axial of the tubular carbon nanotube array 120. Referring to FIG. 3, when the tubular carbon nanotube array 120a has the linear shaped opening, the drawing tool can select the carbon nanotube segment 143 from the tubular carbon nanotube array 120a at a position adjacent to the linear shaped opening, to avoid selecting unneeded carbon nanotubes.

The carbon nanotube structure 100 drawn from the tubular carbon nanotube array can be a carbon nanotube film or a carbon nanotube wire. The drawn carbon nanotube film can be treated by additional steps to form the carbon nanotube wire or carbon nanotube films with narrower width.

In step S13, For drawing the selected carbon nanotube segment 143, the drawing tool moves away from the tubular carbon nanotube array 120 along the direction perpendicular to the axial direction of the tubular carbon nanotube array 120.

During the drawing process, as the initial carbon nanotube segment is drawn out, other carbon nanotube segments are also drawn out end-to-end due to the van der Waals attractive force between ends of adjacent segments. In general, the initially selected carbon nanotubes are drawn out from the tubular carbon nanotube array 120 by the movement of the drawing tool 110. The following carbon nanotubes that are adjacent to the initially selected carbon nanotubes are then drawn out by van der Waals attractive force between the following carbon nanotubes and the initially selected carbon nanotubes thereby forming the carbon nanotube structure 100 with carbon nanotubes joined end-to-end by van der Waals attractive force therebetween. This process of drawing ensures that a continuous, uniform drawn carbon nanotube structure 100. The carbon nanotube structure can be a carbon nanotube film or a carbon nanotube wire. The shape of the carbon nanotube structure 100 is related to the width of the selected carbon nanotube segment 143 and any treatment after the carbon nanotube segments 143 are drawn out.

Referring to FIG. 1, during the drawing step, the formed carbon nanotube structure 100 is connected to the drawing tool at one end and connected to the tubular carbon nanotube array 120 at an opposite end. A drawing angle is defined between the carbon nanotube structure 100 and the tangent plane of the tubular carbon nanotube array 120 at the connecting position of the carbon nanotube structure 100 with the tubular carbon nanotube array 120. As more and more carbon nanotubes are drawn out to leave the substrate 140, the drawing position where the carbon nanotubes in the tubular carbon nanotube array 120 being drawn from is moved. Therefore, during the drawing step, the substrate 140 can rotate around the axis thereof. The rotating of the substrate 140 can compensate the change of the drawing angle caused by the moving of the drawing position. Therefore, the drawing angle can be kept to be the same during the drawing step. Additionally, if the substrate 140 is fixed to not rotate, the drawing tool itself can move around the axis of the substrate 140, to let the drawing position always face the drawing tool.

The drawing angle can be equal to or larger than 0° and smaller than about 90°. In one embodiment, the drawing angle is in a range greater than 0° to about 15°. In one embodiment, the drawing angle of 0° is to be avoided, otherwise impurities on the substrate 140 such as catalyst particles and amorphous carbon particles may be absorbed onto the carbon nanotube structure 100. However, if the drawing angle is too large such as 90°, the van der Waals attractive force between carbon nanotube segments 143 that enables the carbon nanotube segments 143 being pulled out from the tubular carbon nanotube array 120 may get weaker.

The methods for forming the carbon nanotube wire and the carbon nanotube film are to be separately described.

To form the carbon nanotube wire, the initial selected carbon nanotube segment may have a narrow width. Further, the carbon nanotube film can be treated to form the carbon nanotube wire.

The treating step can be processed by applying an organic solvent to the carbon nanotube film. The carbon nanotube film can be soaked by the organic solvent, the adjacent paralleled carbon nanotubes will bundle together, due to the surface tension of the organic solvent when the organic solvent volatilizing, and thus, the carbon nanotube wire can be formed. The organic solvent is volatile, and can be selected from the group consisting of ethanol, methanol, acetone, dichloroethane, chloroform, any appropriate mixture thereof. In one embodiment, the organic solvent is ethanol.

Figure 7:
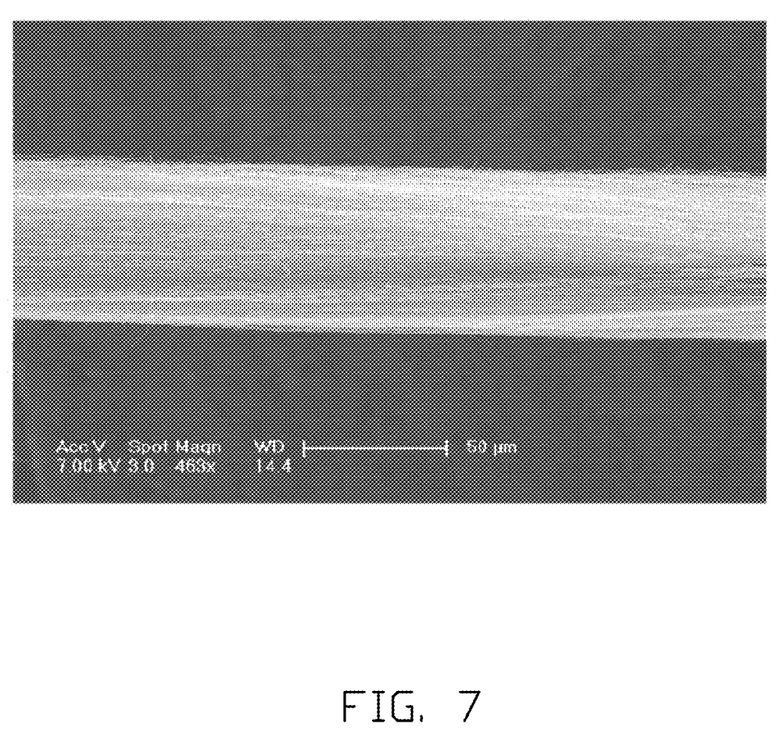
FIG. 7 shows a Scanning Electron Microscope (SEM) image of an untwisted carbon nanotube wire.

Referring to FIG. 7, the carbon nanotube wire formed by applying the organic solvent is an untwisted carbon nanotube wire 102. The untwisted carbon nanotube wire includes a plurality of carbon nanotubes substantially oriented along a same direction (i.e., a direction along the length of the untwisted carbon nanotube wire). The carbon nanotubes are substantially parallel to the axis of the untwisted carbon nanotube wire. More specifically, the untwisted carbon nanotube wire includes a plurality of successive carbon nanotube segments joined end to end by van der Waals attractive force therebetween.

The treating step can also be processed by twisting the carbon nanotube film. The carbon nanotube film can be twisted by rotating the drawing tool 110 around the drawing direction during the drawing process.

Figure 8:
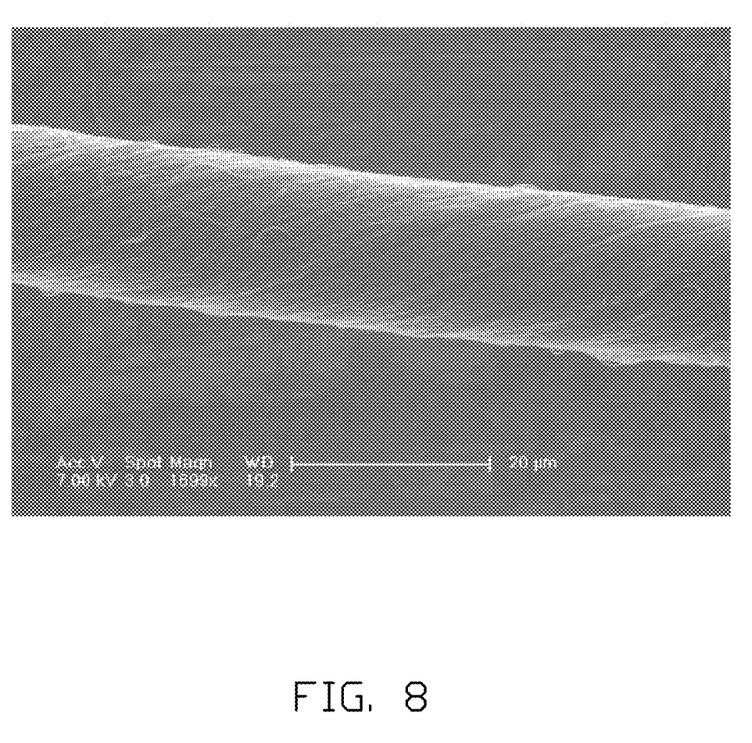
FIG. 8 shows an SEM image of a twisted carbon nanotube wire.

Referring to FIG. 8, the twisted carbon nanotube wire includes a plurality of carbon nanotubes oriented around an axial direction of the twisted carbon nanotube wire. The carbon nanotubes are aligned around the axis of the carbon nanotube twisted wire like a helix. More specifically, the twisted carbon nanotube wire includes a plurality of successive carbon nanotube segments joined end to end by van der Waals attractive force therebetween.

The length of the carbon nanotube structure 100 is related to the size of the tubular carbon nanotube array 120. The larger the tubular carbon nanotube array 120, the more the carbon nanotubes that can be drawn from the tubular carbon nanotube array 120, and the larger length of the carbon nanotube structure 100 that can be formed. To increase the diameter of the carbon nanotube wire, the carbon nanotube segment can be selected along the axial direction of the tubular carbon nanotube array 120 to have a width equal to the length of the tubular carbon nanotube array 120 (i.e., all the carbon nanotubes along the length of the tubular carbon nanotube array 120 are selected). If the length of the tubular carbon nanotube array 120 is about 400 inches, the maximum diameter of the carbon nanotube wire directly drawn from the tubular carbon nanotube array 120 can be larger than 300 microns.

To form a carbon nanotube film, the initially selected carbon nanotube segment may have a wide width. The following carbon nanotube segments 143 joined end to end to the initially selected carbon nanotube segment can have substantially the same width to the initially selected carbon nanotube segment, to form the carbon nanotube film with that width.

Figure 9:
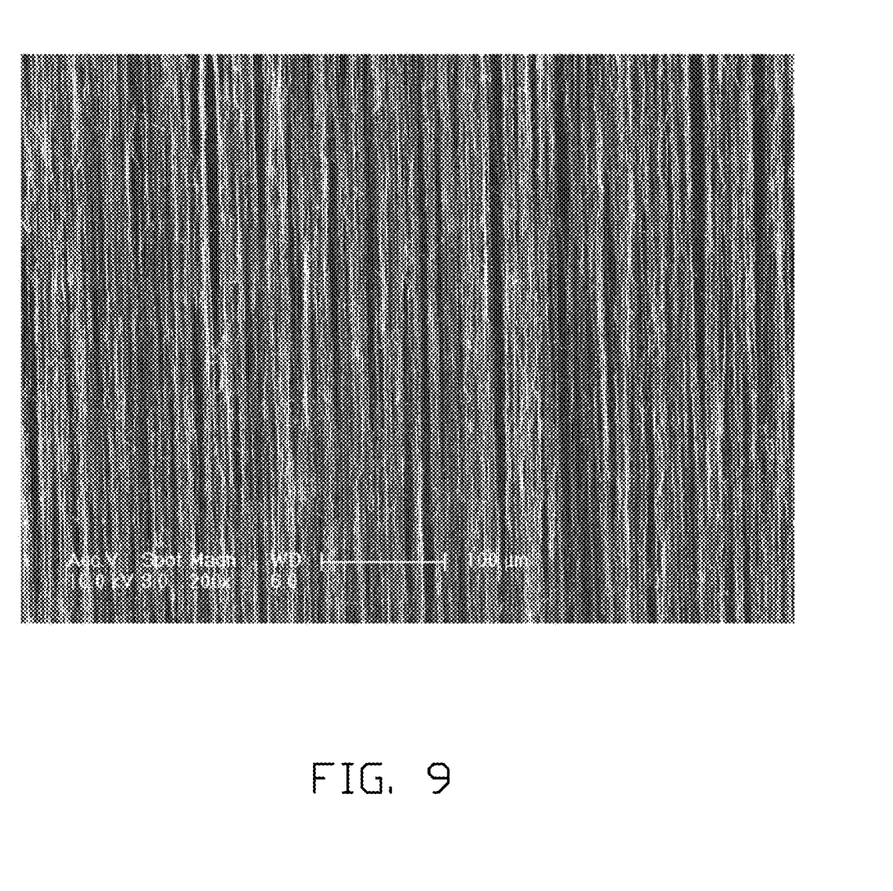
FIG. 9 shows a SEM image of a carbon nanotube film.

Referring to FIG. 9, the carbon nanotube film can have a large specific surface area (e.g., above 100 m$^2$/g). In one embodiment, the carbon nanotube film has a specific surface area in the range of about 200 m$^2$/g to about 2600 m$^2$/g. In one embodiment, the carbon nanotube film has a specific weight of about 0.05 g/m$^2$. The thickness of the carbon nanotube film can be in a range from about 0.5 nm to about 100 microns.

The carbon nanotube film includes a plurality of carbon nanotubes that are arranged substantially parallel to a surface of the carbon nanotube film. A large percentage of the carbon nanotubes in the carbon nanotube film can be oriented along a preferred orientation, meaning that a large number of the carbon nanotubes in the carbon nanotube film are arranged substantially along the same direction. An end of one carbon nanotube is joined to another end of an adjacent carbon nanotube arranged substantially along the same direction, by van der Waals attractive force. A low percentage of the carbon nanotubes are randomly arranged in the carbon nanotube film, and has a small if not negligible effect on the larger number of the carbon nanotubes in the carbon nanotube film arranged substantially along the same direction. It can be appreciated that some variation can occur in the orientation of the carbon nanotubes in the carbon nanotube film. Microscopically, the carbon nanotubes oriented substantially along the same direction may not be perfectly aligned in a straight line, and some curved portions may exist. It can be understood that contact between some carbon nanotubes located substantially side by side and oriented along the same direction cannot be totally excluded.

More specifically, the carbon nanotube film can include a plurality of successively oriented carbon nanotube segments joined end-to-end by van der Waals attractive force therebetween. The carbon nanotubes in the carbon nanotube film are also substantially oriented along a preferred orientation. The width of the carbon nanotube film relates to the size of the tubular carbon nanotube array 120 from which the carbon nanotube film is drawn. The maximum width of a non-stretched carbon nanotube film can be equal to the length of the tubular carbon nanotube array 120 along the axis of the tubular carbon nanotube array 120. The carbon nanotube film is substantially transparent, and has a visible light transmittance greater than about 75%.

Figure 10:
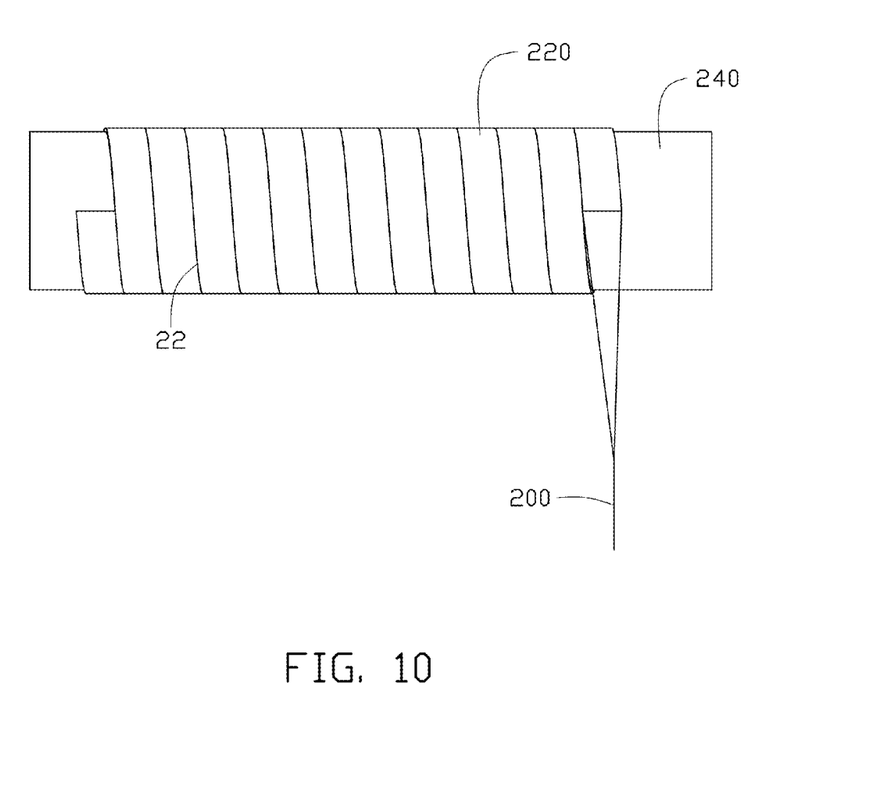
FIG. 10 is a schematic structural view of another embodiment of a process of drawing a carbon nanotube wire from a helix carbon nanotube array.

Referring to FIG. 10, another embodiment of a method for making the carbon nanotube structure 200 includes steps of:

S21, providing a tubular carbon nanotube array 220;

S22, forming at least one groove 22 on the tubular carbon nanotube array 220 to divide the tubular carbon nanotube array 20 into at least one carbon nanotube sub-array;

S23, selecting a carbon nanotube segment 143 from the tubular carbon nanotube sub-array using a drawing tool (e.g., adhesive tape, pliers, tweezers, or another tool allowing multiple carbon nanotubes to be gripped and pulled simultaneously); and S24, drawing the carbon nanotube segment 143 along a direction perpendicular to an axial direction of the tubular carbon nanotube array 220 to achieve the carbon nanotube structure 200.

The second embodiment of the method is similar to the first embodiment. However, in step S22, a carbon nanotube sub-array is formed. The carbon nanotube sub-array has a width along the axial direction of the tubular carbon nanotube array 220, and the width is narrower than the length of the tubular carbon nanotube array 220 along the axial direction. In step S23, the width of the carbon nanotube segment 143 can be equal to the width of the at least one carbon nanotube sub-array. The carbon nanotube segment 143 is selected from the carbon nanotube sub-array along the width direction of the carbon nanotube sub-array.

The groove 22 can be formed by laser etching. More specifically, a laser beam can be focused on the tubular carbon nanotube array 220 at a focusing point to etch the focused carbon nanotubes. The focusing point can move on the surface of the tubular carbon nanotube array 220 to etch a line of carbon nanotubes, thereby forming the groove 22. The carbon nanotubes that are etched by the laser can be completely removed or shortened. A height of the etched line of the carbon nanotubes can be in a range from about 0 to 100 microns. The groove 22 in tubular carbon nanotube array 220 forms at least one carbon nanotube sub-array.

The groove 22 can have a helix shape or a circular shape. The axis of the helix shaped groove 22 and the circular shaped groove 22 is the axis of the tubular carbon nanotube array 220.

As shown in FIG. 10, by using a single helix shaped groove 22, a single carbon nanotube sub-array can be formed with a width equal to the pitch (i.e., the distance between two corresponding points on a helix along the axis), and the carbon nanotube sub-array has a belt shape curved in a helix. In one embodiment, the width of the carbon nanotube sub-array along the axial direction of the tubular carbon nanotube array 220 is about 1 inch. The laser beam can be fixed at a position while the tubular carbon nanotube array 220 is rotated around the axis and moved along the axis, to form the helix shaped groove 22 on the tubular carbon nanotube array 220. The carbon nanotubes that are focused can absorb the high energy of the laser beam, and the carbon nanotubes can be heated to chemically react with oxygen in air to form a carbon dioxide gas. Thus, the carbon nanotubes that are irradiated by the laser beam can be completely removed from the tubular carbon nanotube array 220. In another embodiment, by controlling the focused position and scanning rate, only the top section of the carbon nanotubes can be removed to shorten the length of the carbon nanotubes. Accordingly, the depth of the groove 22 can be controlled as desired. The height of the carbon nanotubes that are etched by the laser beam can be less than 100 microns. The shortened carbon nanotubes less than 100 microns of height cannot be drawn out for the reason that the van der Waals attractive force between the shortened carbon nanotubes and the adjacent original carbon nanotubes is not strong enough. The shorter the carbon nanotubes, the weaker the van der Waals attractive force that are provided between the shortened carbon nanotubes and the original carbon nanotubes. The weakening of the van der Waals attractive force between the shorten carbon nanotubes and the original carbon nanotubes may cause an uneven drawing speed of the carbon nanotubes in the carbon nanotube segment 143. The original carbon nanotubes that are adjacent to the shortened carbon nanotubes can be drawn more quickly than the original carbon nanotubes that are not adjacent to the shortened carbon nanotubes. Thus, the drawn carbon nanotube film may have less uniformity of thickness and density. The height of the shortened carbon nanotubes can be equal to or larger than 1 micron. In one embodiment, the height of the shortened carbon nanotubes is in a range from about 50 microns to about 100 microns. A depth of the groove 22 (D) can be calculated by using a height of the shortened carbon nanotubes (Hs) to minus the height of the original carbon nanotubes (Ho) (i.e., D=Ho−Hs). The Hs can be ranged from 0 micron (completely removed from the substrate) to about 100 microns. The depth of the groove 22 can be ranged from the height of the original carbon nanotubes to about Ho−100 microns.

The width of the groove 22 can be larger than the height of the original carbon nanotubes in the tubular carbon nanotube array 220, to avoid drawing the carbon nanotubes at the opposite side of the groove 22 when drawing the carbon nanotubes at one side of the groove 22. In one embodiment, the height of the original carbon nanotubes is about 200 microns, and the width of the groove 22 is about 250 microns.

The laser beam can be an infrared laser with a wavelength of 1064 nanometers, a $CO_2$ gas laser with a wavelength of 10640 nanometers, or a green light laser with a wavelength of 532 nanometers. The scanning rate of the laser beam can be about 50 mm/s to about 150 mm/s. The power density of the laser beam can be about $5 \times 10^7$ W/m$^2$ to about $5 \times 10^9$ W/m$^2$. In one embodiment, the wavelength of the laser beam is 1054 nanometers, the scanning rate is about 100 mm/s, and the power density is about $1 \times 10^8$ W/m$^2$.

In another embodiment, two or more helix shaped grooves 22 substantially parallel to each other can be formed on the tubular carbon nanotube array 220, to divide the tubular carbon nanotube array 220 into two or more carbon nanotube sub-arrays in helix belt shape. Therefore, two or more carbon nanotube films can be drawn at the same time from the two or more carbon nanotube sub-arrays.

When the groove 22 has a circular shape, the tubular carbon nanotube array 220 can be divided into two carbon nanotube sub-arrays, and the carbon nanotube sub-arrays have tubular structure. One circular shaped groove 22 can divide the tubular carbon nanotube array 220 into two carbon nanotube sub-arrays in tubular shape. Further, two or more circular shaped grooves 22 can divide the tubular carbon nanotube array 220 into three or more carbon nanotube sub-arrays.

In the step S23, the carbon nanotube segment is selected from the carbon nanotube sub-array. The width of the carbon nanotube sub-array is controlled by the groove 22, and width of the drawn carbon nanotube film can be further controlled by the groove 22.

The tubular substrate can have the larger surface area that can be used to grow the carbon nanotube array thereon than the planner shaped substrate, and efficiently use the space in the furnace, accordingly the larger sized carbon nanotube array can be formed. Therefore, the carbon nanotube film that is drawn from the larger sized carbon nanotube array can have the larger width, and the carbon nanotube wire that is drawn from the larger sized carbon nanotube array can have the larger diameter. The carbon nanotube wire with larger width can be used as a transparent conductive film in a large sized device, such as the touch panel and liquid crystal display. The carbon nanotube wire with larger diameter can be used in cable with higher strength.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a carbon nanotube structure, the method comprising:
    making a tubular shaped array of carbon nanotubes;
    forming at least one helix shaped groove on the tubular shaped array of carbon nanotubes by removing carbon nanotubes or shortening carbon nanotubes of the tubular shaped array of carbon nanotubes existed in the at least one helix shaped groove to form at least one carbon nanotube sub-array;
    selecting a carbon nanotube segment from the at least one carbon nanotube sub-array using a drawing tool; and
    drawing the carbon nanotube segment from the at least one carbon nanotube sub-array to obtain the carbon nanotube structure, wherein the carbon nanotube segment is drawn along a direction substantially perpendicular to an axial direction of the tubular shaped array of carbon nanotubes.

2. The method of claim 1, wherein a drawing angle is defined between the carbon nanotube structure and a tangent plane of the tubular shaped array of carbon nanotubes at a connecting position of the carbon nanotube structure with the tubular shaped array of carbon nanotubes, and the drawing angle is greater than or equal to 0° and less than 90°.

3. The method of claim 1, wherein the tubular shaped array of carbon nanotubes is formed by steps of:
    providing a substrate including at least one cylindrical surface;
    forming a catalyst layer on the at least one cylindrical surface; and
    growing the tubular shaped array of carbon nanotubes on the at least one cylindrical surface by using a chemical vapor deposition method.

4. The method of claim 3, wherein the substrate is a solid column with a sidewall and the tubular shaped array of carbon nanotubes is grown on the sidewall of the solid column.

5. The method of claim 3, wherein the substrate is a hollow tubular structure, the hollow tubular structure comprises an outer circumference surface, the tubular shaped array of carbon nanotubes is grown on the outer circumference surface.

6. The method of claim 3, wherein a cross section of the substrate is selected from the group consisting of round-annular, C shaped, rectangle-annular with rounding corners, rectangle-annular with an opening and rounding corners, oval-annular and polygon-annular.

7. The method of claim 3, wherein the tubular shaped array of carbon nanotubes is grown in a tube furnace by arranging an axis of the cylindrical surface along an axial direction of the tube furnace.

8. The method of claim 1, wherein a width of the carbon nanotube segment is equal to a length of the tubular shaped array of carbon nanotubes along an axis of the tubular shaped array of carbon nanotubes.

9. The method of claim 1, wherein the tubular shaped array of carbon nanotubes comprises a plurality of carbon nanotubes, a height of the plurality of carbon nanotubes ranges from about 100 microns to about 900 microns.

10. The method of claim 1, wherein the at least one helix shaped groove is formed by laser etching the tubular shaped array of carbon nanotubes.

11. The method of claim 1 further comprising a step of rotating the tubular shaped array of carbon nanotubes around an axis of the tubular shaped array of carbon nanotubes.

12. The method of claim 1, wherein the carbon nanotube structure is a carbon nanotube film or a carbon nanotube wire.

13. The method of claim 12 further comprising a step of twisting the carbon nanotube film to form a twisted carbon nanotube wire.

14. A method for making a carbon nanotube structure, the method comprising:
   providing a substrate including at least one cylindrical surface, the at least one cylindrical surface defining a linear shaped groove substantially parallel to an axial direction of the at least one cylindrical surface;
   forming a catalyst layer on the at least one cylindrical surface; and
   growing an array of carbon nanotubes on the at least one cylindrical surface by chemical vapor deposition, the array of carbon nanotubes defining a linear shaped opening above the linear shaped groove;
   selecting a carbon nanotube segment from the array of carbon nanotubes using a drawing tool; and
   drawing the carbon nanotube segment from the array of carbon nanotubes to obtain the carbon nanotube structure, wherein the carbon nanotube segment is drawn along a direction substantially perpendicular to the axial direction of the at least one cylindrical surface.

15. The method of claim 14, wherein the carbon nanotube segment is selected from the array of carbon nanotubes at a position adjacent to the linear shaped opening.

16. The method of claim 14, the substrate is a tubular structure comprising a C shaped cross section.

17. A method for making a carbon nanotube structure, the method comprising:
   making a tubular shaped array of carbon nanotubes;
   forming at least one groove on the tubular shaped array of carbon nanotubes by removing carbon nanotubes or shortening carbon nanotubes of the tubular shaped array of carbon nanotubes existed in the at least one groove to form at least one carbon nanotube sub-array;
   selecting a carbon nanotube segment from the at least one carbon nanotube sub-array using a drawing tool; and
   drawing the carbon nanotube segment from the at least one carbon nanotube sub-array to obtain the carbon nanotube structure, wherein the carbon nanotube segment is drawn along a direction substantially perpendicular to an axial direction of the tubular shaped array of carbon nanotubes.

18. The method of claim 17, the at least one groove has a circular shape having an axis direction being the axial direction of the tubular shaped array of carbon nanotubes, and the at least one carbon nanotube sub-array has a tubular shape.

19. The method of claim 1, an axis direction of the at least one helix shaped groove is the axial direction of the tubular shaped array of carbon nanotubes.

* * * * *